United States Patent
Fluharty

Patent Number: 5,121,411
Date of Patent: Jun. 9, 1992

[54] MULTI-EDGE CLOCK RECOVERY METHOD

[75] Inventor: Kevin L. Fluharty, Elgn, Ill.

[73] Assignee: Motorola, Inc., Schaumburg, Ill.

[21] Appl. No.: 559,878

[22] Filed: Jul. 24, 1990

[51] Int. Cl.$^5$ .................................. H04L 25/49
[52] U.S. Cl. .................. 375/20; 375/76; 307/269; 328/63
[58] Field of Search ............. 375/20, 76, 120; 328/63; 329/312; 307/269

[56] References Cited

U.S. PATENT DOCUMENTS

| | | | |
|---|---|---|---|
| 3,864,529 | 2/1975 | Tracey et al. | 375/20 |
| 4,201,942 | 6/1980 | Downer | 375/20 |
| 4,339,823 | 7/1982 | Predina et al. | 375/20 |
| 4,651,026 | 3/1987 | Serfaty et al. | 375/20 |
| 4,899,367 | 2/1990 | Sampei | 375/76 |
| 4,912,726 | 3/1990 | Iwamatsu et al. | 375/20 |

*Primary Examiner*—Safourek Benedict V.
*Assistant Examiner*—Young Tse
*Attorney, Agent, or Firm*—Wayne J. Egan

[57] ABSTRACT

A multi-edge clock recovery method is provided that may be used with data streams having at least three (3) levels. According to the invention, when each threshold is crossed, it generates data edges for that particular threshold. These data edges latching the polarity of the recoverd clock at the time the corresponding threshold was crossed, thereby indicating the "late" and "early" edge information for that threshold crossing with respect to the falling edge of the recovered clock. Immediately following the decoding of the most recent multi-level symbol, the appropriate threshold for the data transition is determined. The decoded values of the sumbols preceding and following the data edges determine which threshold should be selected for "late" and "early" edge indications. The recorded late/early data edge status for this selected threshold is then used for determining when it is necessary to correct the phase of the recovered clock. If clock phase correction required, it is done so prior to the next falling edge of recovered clock to avoid corrupting the next "late" or "early" edge data with the "old" phase of recovered clock.

24 Claims, 3 Drawing Sheets

MULTI-EDGE CLOCK RECOVERY METHOD

TECHNICAL FIELD

This invention relates to multilevel digital signal decoding systems and, more particularly, to a phase corrected clock recovery method for bandlimited multilevel digital signals.

BACKGROUND OF THE INVENTION

As is known, digital signals are conventionally transmitted through a variety of media such as, for example, radio communication links. Such digital signals are transmitted at a rate referred to as the data rate or the clock signal frequency. To decode these signals upon reception, it is necessary to generate a recovered clock signal having a frequency and phase equal to the original clock signal. Once generated, the recovered clock signal is then used to sample the incoming signal at the appropriate times to recover the incoming data information.

Various clock recovery techniques are known in the prior art. One traditional method of clock recovery in a binary environment used the limited version of the data to define the location of the "data edges". The polarity of the receive clock at this data edge defines whether the edge is "early" or "late" with respect to the recovered clock. The appropriate actions may then be taken to correct the phase of the recovered clock.

To more efficiently transmit data, it is common to combine two or more binary data streams to form a multilevel digital signal. To further reduce spectrum consumption, such a multilevel digital signal is usually filtered to remove the excess high-frequency components. This band-limiting process results in a composite multi-level signal whose data edges have smooth or rounded transitions between logic levels.

Such a multilevel signal 100, as in the prior art, is shown in FIG. 1. Referring now to FIG. 1, the signal 100 includes a first +3 level designated 121, a second +1 level designated 123, a third −1 level designated 125, and a fourth −3 level designated 127.

It will be appreciated that if a traditional binary-waveform clock-recovery method with a single threshold is used with the 4-level signal of FIG. 1, the data edges not passing through the limiter's single threshold are not recovered. The 4-level data edges that pass through this traditional single threshold may or may not cross at the true data edge, namely the middle of the transition between the initial logical level and the final logical level in the 4-level data stream.

One prior art technique for extracting a clock signal from a band-limited multi-level signal such as that of FIG. 1 is disclosed in Joseph P. Predina et al., U.S. Pat. No. 4,339,823, entitled "Phase Corrected Clock Signal Recovery Circuit," issued on Jul. 13, 1982, and assigned to Motorola, Inc. (hereinafter "Predina"), which patent is hereby incorporated by reference. As disclosed in Predina, this method uses a transition marker generator which generates a pulse when any threshold is crossed. Referring to FIG. 1, this produces a cluster of transition pulses (corresponding to Predina's FIG. 5A "transition marker group") in the region 141 which is wider than the data edge region 107 produced by a standard limiter. Each transition marker group is followed by an eye interval 143, corresponding to Predina's FIG. 5A elements 100', 110', 120'.

Referring still to Predina, it will be appreciated that his method locks the recovered clock to the transition marker group as follows: The transition marker group is sent to a phase error detector and an electronically-tuned bandpass filter (hereinafter "ETBPF"). The ETBPF then extracts the fundamental harmonic of the clock, which a phase lock loop (PLL) locks to, thereby producing a recovered clock. The phase error detector then compares the transition marker group to the phase of the recovered clock and then adjusts the phase shift of the ETBPF accordingly which, in turn, adjusts the phase of the recovered clock. By this process, the recovered clock's falling edge tries to remain centered with respect to the transition marker group. The problem with this method is, of course, that the transition marker group itself occupies a random position within the region 141, resulting in clocking errors.

As a result, there is a need for an improved method for clock recovery from a multi-level signal.

SUMMARY OF THE INVENTION

It is an object of the invention to provide an improved method for clock recovery that may be used with a multi-level signal. Accordingly, a multi-edge clock recovery method is provided.

According to the invention, when each threshold is crossed, it generates data edges for that particular threshold. These data edges latch in the polarity of the recovered clock at the time the corresponding threshold was crossed, thereby indicating the "late" and "early" edge information for that threshold crossing with respect to the falling edge of the recovered clock.

Immediately following the decoding of the most recent multi-level symbol, the threshold crossing corresponding to the level transition is determined. The decoded values of the symbols preceding and following the data edges determine which threshold should be selected for "late" and "early" edge indications. The recorded late/early data edge status for this selected threshold is then used for determining if it is necessary to correct the phase of the recovered clock. If clock phase correction is required, it is done so prior to the next falling edge of recovered clock to avoid corrupting the next "late" or "early" edge data with the "old" phase of recovered clock.

In one embodiment, the invention may be viewed as a method for adjusting a clock based on a signal with multiple levels in a receiver having a predetermined threshold for each transition between each pair of levels comprising the steps of:

(a) determining which threshold corresponds to the transition between the present level and the previous level;

(b) determining the time the signal crossed the threshold determined from step (a);

(c) determining whether the time determined from step (b) is later or earlier than the time predicted by the clock;

(d) when the determination from step (c) is later, then retarding the clock by a predetermined unit of time or phase; otherwise, then accelerating the clock by a predetermined unit of time or phase.

In another embodiment, the invention may be viewed as a variation of the above method, comprising the steps of:

(a) determining which threshold corresponds to the transition between the present level and the previous level;

(b) determining the time the signal crossed the threshold determined from step (a);
(c) determining whether the time determined from step (b) is later or earlier than the time predicted by the clock;
(d) repeating the above steps (a)-(c) for successive received levels;
(e) averaging the results from step (c) over time;
(f) when the time-averaged results from step (e) is later, then retarding the clock by a predetermined unit of time or phase; otherwise, then accelerating the clock by a predetermined unit of time or phase.

DETAILED DESCRIPTION OF THE INVENTION

Figure 1:
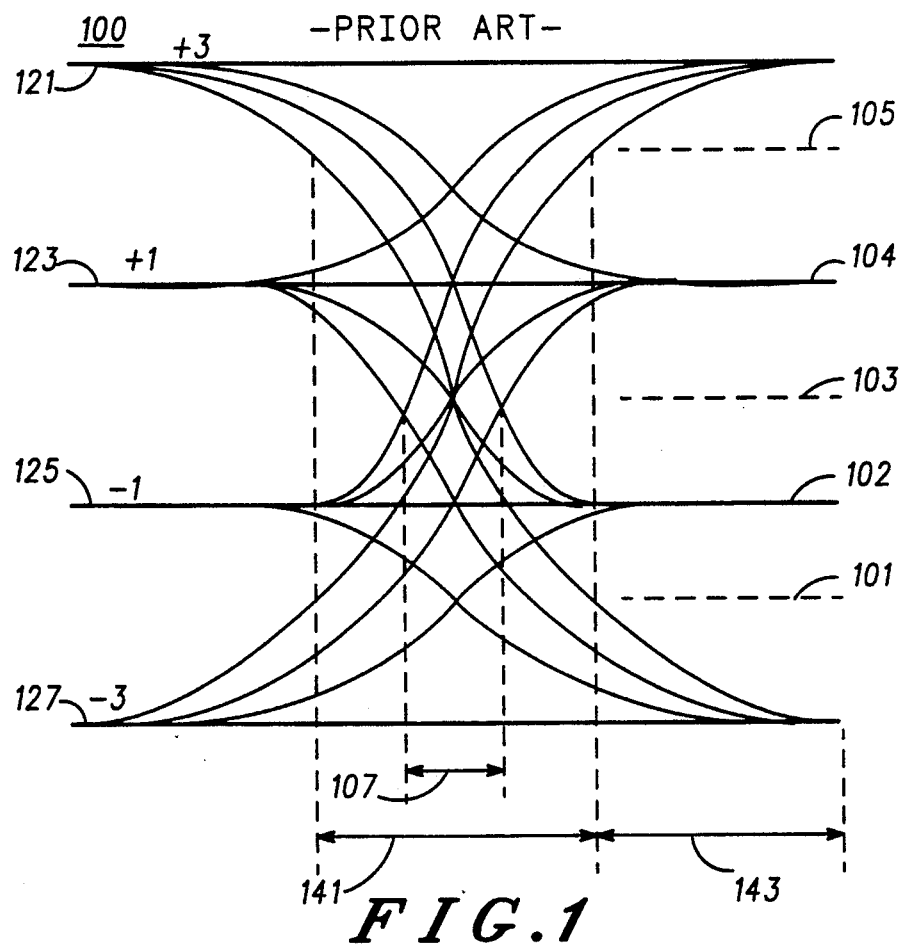
FIG. 1 shows a band-limited multi-level data signal, as in the prior art.
Figure 2:
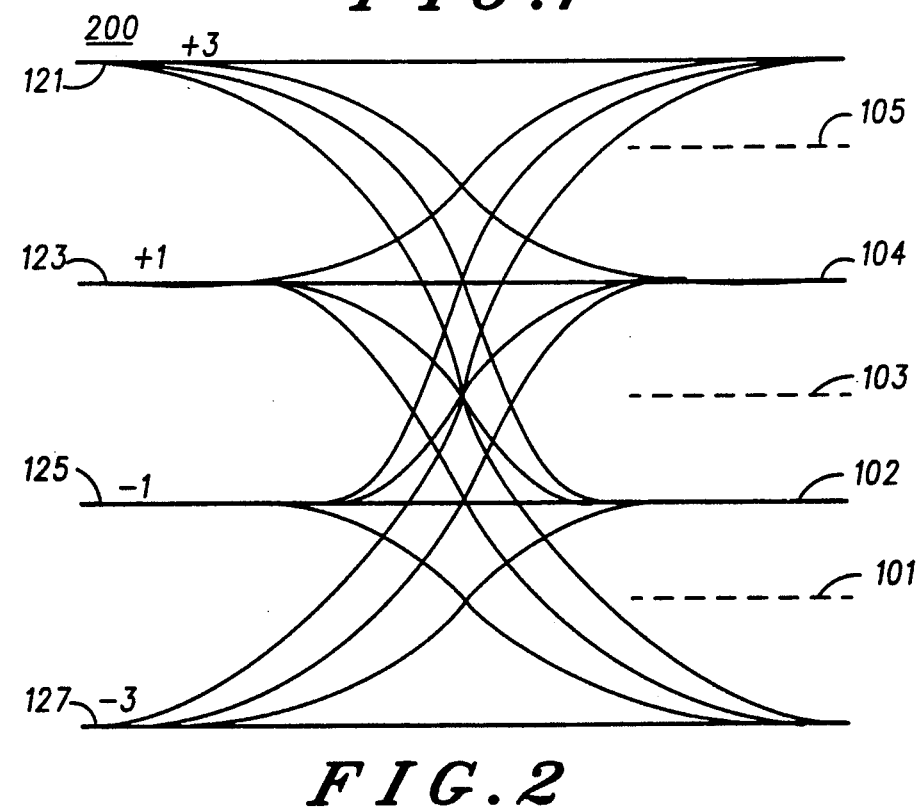
FIG. 2 shows a first embodiment of a multi-edge clock recovery method, according to the invention.

Referring now to FIG. 2, there is shown a first embodiment 200 of a multi-edge clock recovery method, according to the invention. As shown, the data stream includes a first $+3$ level designated 121, a second $+1$ level designated 123, a third $-1$ level designated 125, and a fourth $-3$ level designated 127.

The 4-level data stream includes a first threshold 101 for transitions between level $-1$ and level $-3$; a second threshold 102 for transitions between level $+1$ and level $-3$; a third threshold 103 for transitions between level $+1$ and level $-1$ or between level $+3$ and level $-3$; a fourth threshold 104 for transitions between level $+3$ and level $-1$; and a fifth threshold 105 for transitions between level $+1$ and level $+3$.

According to the invention, a data edge is generated when each threshold is crossed. The data edges may then be used to latch in the polarity of the recovered clock at the time the corresponding threshold was crossed, thereby indicating the "late" and "early" edge information for that threshold crossing with respect to the falling edge of the recovered clock. Immediately following the decoding of the most recent symbol, the appropriate threshold crossing for the data transition is determined, based on the decoded values of the preceding symbol. This threshold crossing is then used as the timing source for phase lock.

Those skilled in the art will appreciate that the present invention uses the correct threshold crossing itself to determine the correct phase of the recovered clock. As a result, any suitable phase-correction algorithm may be used which processes the late/early indications in such a manner so that the phase of the recovered clock is responsive to the time-varying average of the late/early phase indications.

In one embodiment, a variety of accumulator sizes may be used to process "late" and "early" signal outputs. If clock phase correction is required, it may be done so prior to the next falling edge of recovered clock. The reason for this is to avoid corrupting the next "late" or "early" edge data with the "old" phase of recovered clock.

Figure 3:
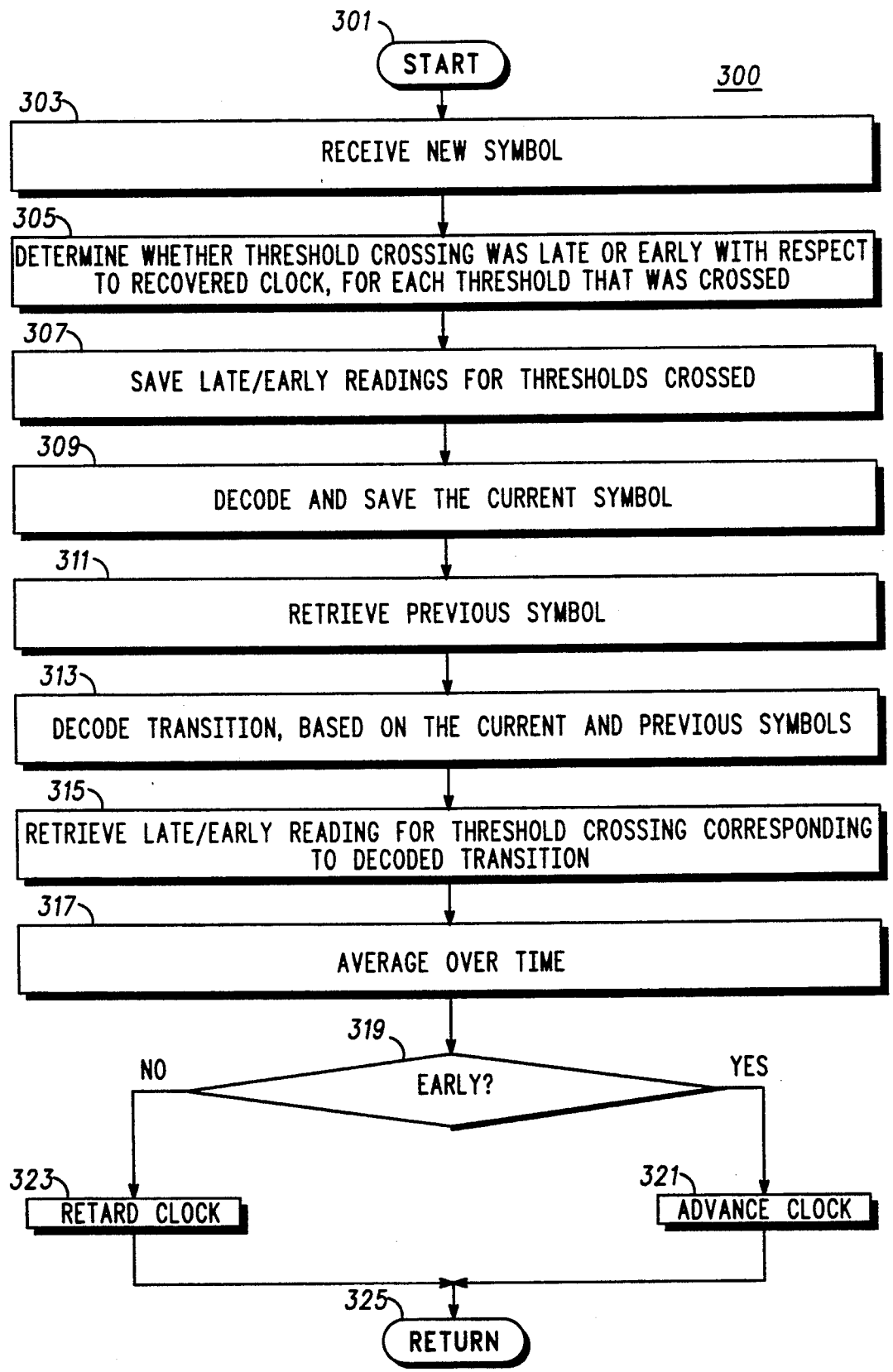
FIG. 3 is a flow diagram for the first embodiment.

Turning now to FIG. 3 there is a flow diagram 300 for the first embodiment.

The process starts at step 301 and then goes to step 303, where it receives a new symbol. It will be assumed that the current symbol is the nth symbol in a series of received symbols.

The process then goes to step 305, where it determines whether the threshold crossing was late or early with respect to the recovered clock, for each threshold that was crossed. For example, a value of logic 0 may be generated if the threshold crossing was late, or else a value of logic 1 may be generated if the threshold crossing was early.

The process then goes to step 307, where it saves the late (0) or early (1) readings for each threshold crossed.

The process then decodes and saves the current, or nth, symbol, step 309.

The process then goes to step 311, where it looks up the previous, or $(n-1)$th, symbol.

The process then goes to step 313, where it decodes the logic transition, based on the current, or nth, and previous, or $(n-1)$th, symbols.

The process then goes to step 315, where it uses the decoded transition to look up the late (0) or early (1) edge data that was stored in the previous step 307, described above. Stated otherwise, the process here retrieves the stored late/early reading for the threshold crossing corresponding to the decoded transition.

The process then goes to step 317, where it averages over time the retrieved value, that is, the result from step 315. Any suitable algorithm may be used here that determines whether the average value of the retrieved late/early reading from step 315 is late (average value=logic 0), or whether it is early (average value=logic 1).

The process next goes to step 319, where it determines whether the average value determined in step 317 was early (value=logic 1). If the determination here is affirmative, then the process goes to step 321, where it advances the clock by a predetermined unit of time, or phase. The process then returns (step 325) to start, step 301.

On the other hand, if the determination from step 319 is negative, then the average value determined in step 317 was late (value=logic 0). As a result, the process goes to step 323, where it retards the clock by a predetermined unit of time, or phase. The process then returns (step 325) to start, step 301. It will be appreciated that the above process is now repeated for the $(n+1)$th symbol, and so forth.

Note that this flowchart illustrates the order of events only if a data edge occurs. If consecutive symbols stay at the same level, obviously there will be no data edge transitions.

It will be appreciated that a multi-edge clock recovery method, according to the invention, may be used with any data stream having at least three (3) levels.

It will be appreciated that one advantage of a multi-edge clock recovery method, according to the invention, is that, since the location of the true data edges can be more precisely defined, including those edges previously missed by prior art-type multi-level recovery, the resulting jitter in the recovered clock can be reduced.

A multi-edge clock recovery method, according to the invention, also may be used, for instance, in simulcast applications where low jitter, with respect to the data source, clock recovery is necessary to minimize the jitter between simulcast transmitter sites.

Figure 4:
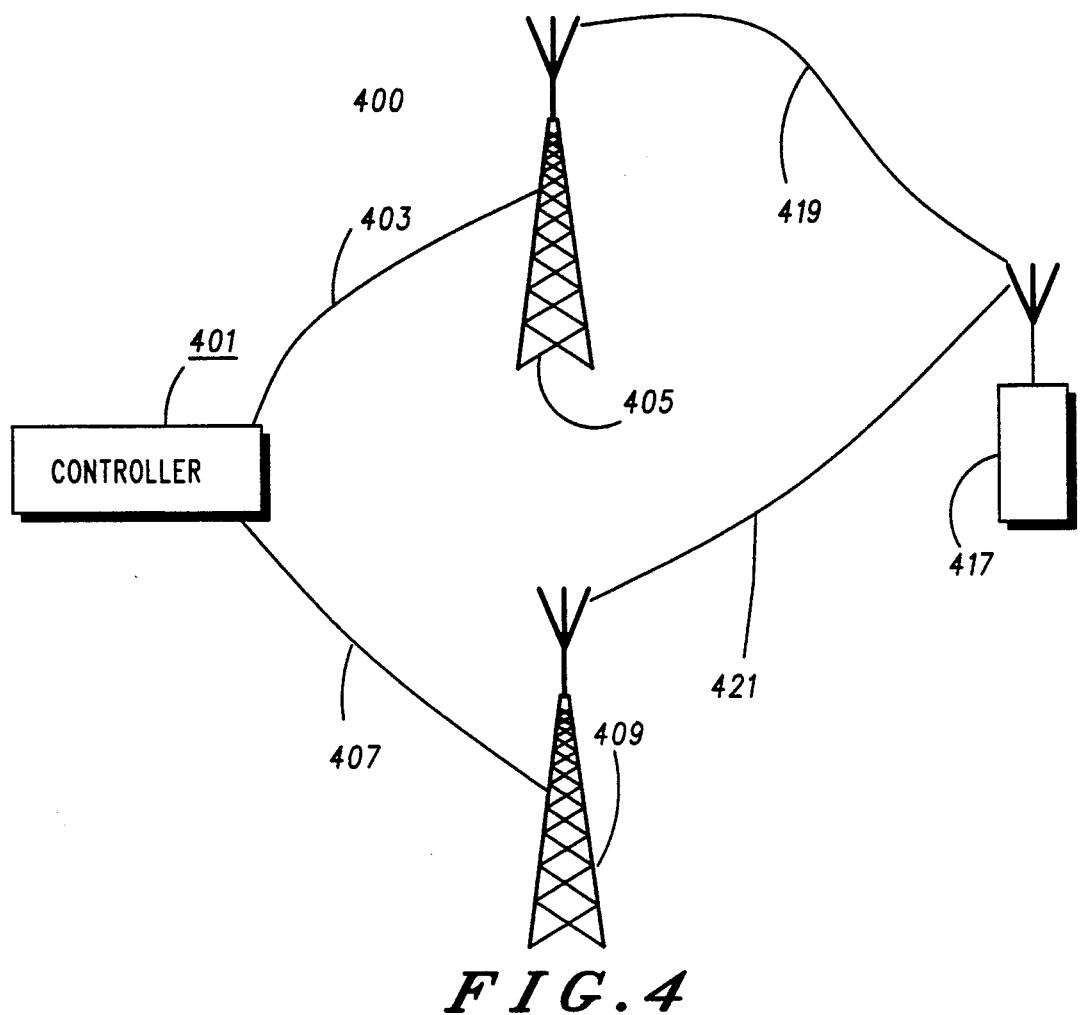
FIG. 4 is a block diagram showing a typical application for the first embodiment.

Such a simulcast application is shown in FIG. 4. There is shown a simulcast system 400 including a controller 401 coupled to a first transmitter 405 via a first facility 403 and further coupled to a second transmitter 409 via a second facility 407.

A typical subscriber unit 417 is shown, the subscriber 417 including a receiver arranged to receive a multi-level signal. As shown, the subscriber 417 may receive a first multi-level data signal 419 from the first transmitter 405, or else a second multi-level data signal 421 from the second transmitter 409. Alternately, in the event the subscriber 417 is in an equal power region, the subscriber 417 may receive both signals —the first signal 419 from the first transmitter 405 and the second signal 421 from the second transmitter 409. In this last case, the fundamental difference between the two received signals 419 and 421 will be due to propagation delay.

It will be appreciated that the first transmitter 405, the second transmitter 409, and the subscriber 417 may all be arranged to recover a clock signal from the multi-level data signal in accordance with the present invention.

In FIG. 4, jitter can be thought of as a variation in the instantaneous phasing, or time delays, of the respective simulcast transmitter sites 405 and 409. It will be appreciated that the present method of the invention is less costly than the prior method of providing a common data clock over the entire system, which would require a dedicated channel in the baseband in addition to the clock recovery equipment at each site.

By using a multi-edge clock recovery method, according to the invention, in the data recovery/reclocking portion of transmitter sites 405 and 409, a further benefit is achieved since the reduction in peak-to-peak jitter at one transmitter site such as, for example, 405 with respect to the original code source at the controller 401 yields a corresponding reduction in peak-to-peak jitter between the various simulcast transmitter sites 405 and 409. Jitter reduction also aids in the phasing of a digital simulcast system, since the relative time delays are more easily measured.

Figure 5:
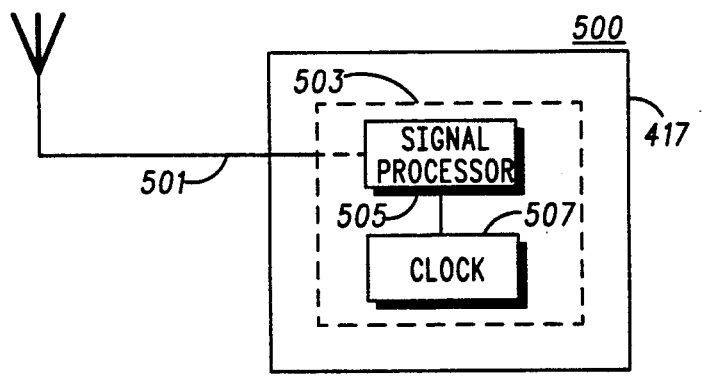
FIG. 5 is a block diagram showing a subscriber unit equipped with a receiver that is arranged to recover a clock signal from a multi-level digital signal in accordance with the present invention.

FIG. 5 is a block diagram showing the subscriber unit 419 from FIG. 4. As shown, the subscriber unit 419 is equipped with a receiver 503 that is arranged to recover a clock signal from the received multi-level signal 501 according to the invention. As shown, the receiver 503 includes a signal processor 505 that is arranged to adjust a clock 507 based on the multi-level signal 501 in accordance with the method of the present invention. It will be appreciated that the processor 505 may comprise, for example, a suitably-programmed digital signal processor, commonly known as a "DSP". The DSP56000 part manufactured by Motorola, Inc. is one example of a suitable DSP for this application. This DSP part may be programmed in accordance with user's manual #DSP56000UM/AD, also available from Motorola, Inc.

While various embodiments of a multi-edge clock recovery method, according to the present invention, have been described hereinabove, the scope of the invention is defined by the following claims.

What is claimed is:

1. A method for adjusting a clock based on a signal with multiple levels in a receiver having a predetermined threshold for each transition between each pair of levels, the method based on successive received signal levels and comprising the steps of:
   (a) determining which threshold corresponds to the transition between the present received level and the previous received level;
   (b) determining the time the signal crossed the threshold determined from step (a);
   (c) comparing the time determined in step (b) with said clock, and determining whether the time determined in step (b) is later or earlier than the time predicted by said clock for the signal crossing said threshold;
   (d) when the late/early determination in step (c) is late, then retarding the clock; otherwise, then accelerating the clock.

2. The method of claim 1, wherein step (d), said clock is either retarded by a predetermined unit of time or phase, or else accelerated by a predetermined unit of time or phase.

3. A method for adjusting a clock based on a signal with multiple levels in a receiver having a predetermined threshold for each transition between each pair of levels, the method based on successive received signal levels and comprising the steps of:
   (a) determining which threshold corresponds to the transition between the present received level and the previous received level;
   (b) determining the time the signal crossed the threshold determined from step (a);
   (c) comparing the time determined in step (b) with said clock, and determining whether the time determined in step (b) is later or earlier than the time predicted by said clock for the signal crossing said threshold;
   (d) repeating the above steps (a)-(c) for successive received levels;
   (e) averaging the late/early results from step (c) over time;
   (f) when the time-averaged results from step (e) is late, then retarding the clock; otherwise, then accelerating the clock.

4. The method of claim 3, wherein step (f), said clock is either retarded by a predetermined unit of time or phase, or else accelerated by a predetermined unit of time or phase.

5. A receiver arranged for receiving a signal with multiple levels, said receiver having a predetermined threshold for each transition between each pair of levels, said receiver having a clock and arranged for adjusting said clock based on successive received signal levels according to a predetermined method, the method comprising the steps of:
   (a) determining which threshold corresponds to the transition between the present received level and the previous received level;
   (b) determining the time the signal crossed the threshold determined from step (a);
   (c) comparing the time determined in step (b) with said clock, and determining whether the time determined in step (b) is later or earlier than the time predicted by said clock for the signal crossing said threshold;
   (d) when the late/early determination in step (c) is late, then retarding the clock; otherwise, then accelerating the clock.

6. The receiver of claim 5, wherein step (d), said clock is either retarded by a predetermined unit of time or phase, or else accelerated by a predetermined unit of time or phase.

7. A receiver arranged for receiving a signal with multiple levels, said receiver having a predetermined threshold for each transition between each pair of levels, said receiver having a clock and arranged for adjusting said clock based on successive received signal levels according to a predetermined method, the method comprising the steps of:
 (a) determining which threshold corresponds to the transition between the present received level and the previous received level;
 (b) determining the time the signal crossed the threshold determined from step (a);
 (c) comparing the time determined in step (b) with said clock, and determining whether the time determined in step (b) is later or earlier than the time predicted by said clock for the signal crossing said threshold;
 (d) repeating the above steps (a)—(c) for successive received levels;
 (e) averaging the late/early results from step (c) over time;
 (f) when the time-averaged results from step (e) is late, then retarding the clock; otherwise, then accelerating the clock.

8. The receiver of claim 7, wherein step (f), said clock is either retarded by a predetermined unit of time or phase, or else accelerated by a predetermined unit of time or phase.

9. A subscriber unit arranged for use in a radio communication system, said subscriber unit including a receiver for receiving a signal with multiple levels, said receiver having a predetermined threshold for each transition between each pair of levels, said receiver arranged for recovering a clock signal based on successive received signal levels according to a predetermined method, said method comprising the steps of:
 (a) determining which threshold corresponds to the transition between the present received level and the previous received level;
 (b) determining the time the signal crossed the threshold determined from step (a);
 (c) comparing the time determined in step (b) with said clock, and determining whether the time determined in step (b) is later or earlier than the time predicted by said clock for the signal crossing said threshold;
 (d) when the late/early determination from step (c) is late, then retarding the clock; otherwise, then accelerating the clock.

10. The subscriber unit of claim 9, wherein step (d), said clock is either retarded by a predetermined unit of time or phase, or else accelerated by a predetermined unit of time or phase.

11. A subscriber unit arranged for use in a radio communication system, said subscriber unit including a receiver for receiving a signal with multiple levels, said receiver having a predetermined threshold for each transition between each pair of levels, said receiver having a clock and arranged for adjusting said clock based on successive received signal levels according to a predetermined method, the method comprising the steps of:
 (a) determining which threshold corresponds to the transition between the present received level and the previous received level;
 (b) determining the time the signal crossed the threshold determined from step (a);
 (c) comparing the time determined in step (b) with said clock, and determining whether the time determined in step (b) is later or earlier than the time predicted by said clock for the signal crossing said threshold;
 (d) repeating the above steps (a)—(c) for successive received levels;
 (e) averaging the late/early results from step (c) over time;
 (f) when the time-averaged results from step (e) is late, then retarding the clock; otherwise, then accelerating the clock.

12. The receiver of claim 11, wherein step (f), said clock is either retarded by a predetermined unit of time or phase, or else accelerated by a predetermined unit of time or phase.

13. A method (300) for adjusting a clock based on a signal with multiple levels in a receiver having a predetermined threshold for each transition between each pair of levels, the method based on successive received signal levels and comprising the steps of:
 (a) receive a new level (303);
 (b) for each threshold that was crossed in step (a), determine whether the threshold crossing was late or early with respect to the clock (305);
 (c) save the late/early readings for the thresholds crossed, as in step (b) (307);
 (d) decode and save the current level (309);
 (e) retrieve the previous level (311);
 (f) decode the current transition, based on the previous level, as in step (e), and the current level, as in step (d) (313);
 (g) retrieve the late/early reading for the threshold crossing corresponding to the decoded transition, as in step (f) (315); and,
 (h) when the late/early determination in step (g) is early (319) then advance the clock (321), otherwise retard the clock (323).

14. The method of claim 13, wherein in step (h), the clock is either advanced by a predetermined unit of time or phase, or else retarded by a predetermined unit of time or phase.

15. A method (300) for adjusting a clock based on a signal with multiple levels in a receiver having a predetermined threshold for each transition between each pair of levels, the method based on successive received signal levels and comprising the steps of:
 (a) receive a new level (303);
 (b) for each threshold that was crossed in step (a), determine whether the threshold crossing was late or early with respect to the clock (305);
 (c) save the late/early readings for the thresholds crossed, as in step (b) (307);
 (d) decode and save the current level (309);
 (e) retrieve the previous level (311);
 (f) decode the current transition, based on the previous level, as in step (e), and the current level, as in step (d) (313);
 (g) retrieve the late/early reading for the threshold crossing corresponding to the decoded transition, as in step (f) (315);
 (h) average the late/early result from step (g) over time (317);
 (i) when the time-averaged late/early determination from step (h) is early (319) then advance the clock (321), otherwise retard the clock (323); and, (j) repeat steps (a)–(i) for successive received levels (325).

16. The method of claim 15, wherein step (i), the clock is either advanced by a predetermined unit of time or phase, or else retarded by a predetermined unit of time or phase.

17. A receiver for receiving a signal with multiple levels, the receiver having a predetermined threshold for each transition between each pair of levels, the receiver having a clock and arranged for adjusting the clock based on successive received signal levels according to a method (300), the method comprising the steps of:
(a) receive a new level (303);
(b) for each threshold that was crossed in step (a), determine whether the threshold crossing was late or early with respect to the clock (305);
(c) save the late/early readings for the thresholds crossed, as in step (b) (307);
(d) decode and save the current level (309);
(e) retrieve the previous level (311);
(f) decode the current transition, based on the previous level, as in step (e), and the current level, as in step (d) (313);
(g) retrieve the late/early reading for the threshold crossing corresponding to the decoded transition, as in step (f) (315); and,
(h) when the late/early determination in step (g) is early (319) then advance the clock (321), otherwise retard the clock (323).

18. The receiver of claim 17, wherein in step (h), the clock is either advanced by a predetermined unit of time or phase, or else retarded by a predetermined unit of time or phase.

19. A receiver for receiving a signal with multiple levels, the receiver having a predetermined threshold for each transition between each pair of levels, the receiver having a clock and arranged for adjusting the clock based on successive received signal levels according to a method (300), the method comprising the steps of:
(a) receive a new level (303);
(b) for each threshold that was crossed in step (a), determine whether the threshold crossing was late or early with respect to the clock (305);
(c) save the late/early readings for the thresholds crossed, as in step (b) (307);
(d) decode and save the current level (309);
(e) retrieve the previous level (311);
(f) decode the current transition, based on the previous level, as in step (e), and the current level, as in step (d) (313);
(g) retrieve the late/early reading for the threshold crossing corresponding to the decoded transition, as in step (f) (315);
(h) average the late/early result from step (g) over time (317);
(i) when the time-averaged late/early determination from step (h) is early (319) then advance the clock (321), otherwise retard the clock (323); and,
(j) repeat steps (a)–(i) for successive received levels (325).

20. The receiver of claim 19, wherein step (i), the clock is either advanced by a predetermined unit of time or phase, or else retarded by a predetermined unit of time or phase.

21. A subscriber unit including a receiver for receiving a signal with multiple levels, the receiver having a predetermined threshold for each transition between each pair of levels, the receiver having a clock and arranged for adjusting the clock based on successive received signal levels according to a method (300), the method comprising the steps of:
(a) receive a new level (303);
(b) for each threshold that was crossed in step (a), determine whether the threshold crossing was late or early with respect to the clock (305);
(c) save the late/early readings for the thresholds crossed, as in step (b) (307);
(d) decode and save the current level (309);
(e) retrieve the previous level (311);
(f) decode the current transition, based on the previous level, as in step (e), and the current level, as in step (d) (313);
(g) retrieve the late/early reading for the threshold crossing corresponding to the decoded transition, as in step (f) (315); and,
(h) when the late/early determination in step (g) is early (319) then advance the clock (321), otherwise retard the clock (323).

22. The subscriber unit of claim 21, wherein in step (h), the clock is either advanced by a predetermined unit of time or phase, or else retarded by a predetermined unit of time or phase.

23. A subscriber unit including a receiver for receiving a signal with multiple levels, the receiver having a predetermined threshold for each transition between each pair of levels, the receiver having a clock and arranged for adjusting the clock based on successive received signal levels according to a method (300), the method comprising the steps of:
(a) receive a new level (303);
(b) for each threshold that was crossed in step (a), determine whether the threshold crossing was late or early with respect to the clock (305);
(c) save the late/early readings for the thresholds crossed, as in step (b) (307);
(d) decode and save the current level (309);
(e) retrieve the previous level (311);
(f) decode the current transition, based on the previous level, as in step (e), and the current level, as in step (d) (313);
(g) retrieve the late/early reading for the threshold crossing corresponding to the decoded transition, as in step (f) (315);
(h) average the late/early result from step (g) over time (317);
(i) when the time-averaged late/early determination from step (h) is early (319) then advance the clock (321), otherwise retard the clock (323); and,
(j) repeat steps (a)–(i) for successive received levels (325).

24. The subscriber unit of claim 23, wherein step (i), the clock is either advanced by a predetermined unit of time or phase, or else retarded by a predetermined unit of time or phase.

* * * * *

UNITED STATES PATENT AND TRADEMARK OFFICE
CERTIFICATE OF CORRECTION

PATENT NO. : 5,121,411
DATED : June 9, 1992
INVENTOR(S) : Kevin L. Fluharty

It is certified that error appears in the above-identified patent and that said Letters Patent is hereby corrected as shown below:

In the Abstract:

Line 5, "latching" should be --latch

Line 18, "correction required" should be --correction is required--.

Signed and Sealed this

Nineteenth Day of October, 1993

Attest:

BRUCE LEHMAN

*Attesting Officer*           *Commissioner of Patents and Trademarks*